(12) United States Patent
Ganzel et al.

(10) Patent No.: US 12,024,139 B2
(45) Date of Patent: Jul. 2, 2024

(54) APPARATUS AND METHOD FOR SELECTIVELY ACTUATING WHEEL BRAKES OF A HYDRAULIC BRAKE SYSTEM

(71) Applicant: ZF Active Safety US Inc, Livonia, MI (US)

(72) Inventors: Blaise J. Ganzel, Ann Arbor, MI (US); Frank Einig, Ochtendung (DE)

(73) Assignee: ZF Active Safety US Inc., Livonia, MI (US)

( * ) Notice: Subject to any disclaimer, the term of this patent is extended or adjusted under 35 U.S.C. 154(b) by 218 days.

(21) Appl. No.: 17/366,715

(22) Filed: Jul. 2, 2021

(65) Prior Publication Data

US 2023/0001903 A1  Jan. 5, 2023

(51) Int. Cl.
*B60T 13/58* (2006.01)
*B60T 7/04* (2006.01)
(Continued)

(52) U.S. Cl.
CPC .............. *B60T 13/58* (2013.01); *B60T 7/042* (2013.01); *B60T 13/148* (2013.01);
(Continued)

(58) Field of Classification Search
CPC ...... B60T 13/58; B60T 13/686; B60T 13/148; B60T 13/746; B60T 7/042; B60T 2270/402; B60T 2270/404; B60T 2270/82; B60T 2220/04; H02K 7/06; H02K 7/116; F16D 2121/02
See application file for complete search history.

(56) References Cited

U.S. PATENT DOCUMENTS

2018/0334149 A1* 11/2018 Feigel .................. B60T 13/148
2020/0023825 A1* 1/2020 Mitchell .................. B60T 8/17
(Continued)

FOREIGN PATENT DOCUMENTS

DE 102013224870 A1 9/2014
DE 102017008948 A1 3/2019
(Continued)

OTHER PUBLICATIONS

German Search Report for corresponding German Application Serial No. 10 2022 206 560.3, dated Feb. 14, 2023, pp. 1-12.

*Primary Examiner* — Vishal R Sahni
(74) *Attorney, Agent, or Firm* — Kristin L. Murphy

(57) ABSTRACT

A brake system for selectively actuating at least one wheel brake includes a reservoir and a power transmission unit for selectively providing pressurized hydraulic fluid for actuating at least a selected one of the wheel brakes during a braking event. A first electronic control unit at least partially controls at least one of the power transmission unit and a selected one of the pair of rear brake motors. A second electronic control unit at least partially controls at least one of the power transmission unit and an other one of the pair of rear brake motors. The first electronic control unit controls at least one SAP valve, an isolation valve, and a dump valve for a selected two of the wheel brakes, and the second electronic control unit controls at least one SAP valve, an isolation valve, and a dump valve for an other two of the wheel brakes.

15 Claims, 12 Drawing Sheets

(51) Int. Cl.
| | |
|---|---|
| *B60T 13/14* | (2006.01) |
| *B60T 13/68* | (2006.01) |
| *B60T 13/74* | (2006.01) |
| *H02K 7/06* | (2006.01) |
| *H02K 7/116* | (2006.01) |
| *F16D 121/02* | (2012.01) |
| *F16D 121/24* | (2012.01) |
| *F16D 125/08* | (2012.01) |
| *F16D 125/24* | (2012.01) |
| *F16D 125/40* | (2012.01) |
| *F16D 125/50* | (2012.01) |

(52) U.S. Cl.
CPC .......... *B60T 13/686* (2013.01); *B60T 13/746* (2013.01); *H02K 7/06* (2013.01); *H02K 7/116* (2013.01); *B60T 2220/04* (2013.01); *B60T 2270/402* (2013.01); *B60T 2270/404* (2013.01); *B60T 2270/82* (2013.01); *F16D 2121/02* (2013.01); *F16D 2121/24* (2013.01); *F16D 2125/08* (2013.01); *F16D 2125/24* (2013.01); *F16D 2125/40* (2013.01); *F16D 2125/50* (2013.01)

(56) References Cited

U.S. PATENT DOCUMENTS

| | | | | |
|---|---|---|---|---|
| 2020/0114888 | A1* | 4/2020 | Michels | B60T 8/4077 |
| 2020/0361429 | A1* | 11/2020 | Jahnke | B60R 16/023 |
| 2021/0179051 | A1* | 6/2021 | Alford | B60T 13/142 |
| 2022/0169225 | A1* | 6/2022 | Hong | B60T 8/368 |
| 2022/0250601 | A1* | 8/2022 | Kim | B60T 17/04 |

FOREIGN PATENT DOCUMENTS

| | | | |
|---|---|---|---|
| DE | 102018002990 A1 * | 10/2019 | ............ B60T 13/142 |
| WO | 2022/063366 A1 | 3/2022 | |

* cited by examiner

APPARATUS AND METHOD FOR SELECTIVELY ACTUATING WHEEL BRAKES OF A HYDRAULIC BRAKE SYSTEM

TECHNICAL FIELD

This disclosure relates to an apparatus and method for selectively actuating wheel brakes of a hydraulic brake system and, more particularly, to a method and apparatus of selectively actuating at least one of a right rear wheel brake, a left front wheel brake, a left rear wheel brake, and a right front wheel brake in a brake system.

BACKGROUND

A brake system may include a plurality of wheel brakes and a hydraulic braking pressure generator, a braking pressure modulator which is provided in the pressure fluid conduits between the braking pressure generator and the wheel brakes and which serves to vary the braking pressure by changing the volume of a chamber containing the hydraulic fluid, sensors for determining the wheel rotational behavior, and electronic circuits for processing the sensor signals and for generating braking-pressure control signals. Brake systems may also include an electronic control unit that can be used to provide a braking command to the wheel brakes, autonomously and/or manually (e.g., via the use of an operator-manipulable brake pedal).

SUMMARY

In an aspect, a brake system for selectively actuating at least one of a right rear wheel brake, a left front wheel brake, a left rear wheel brake, and a right front wheel brake is disclosed. The system includes a reservoir and a power transmission unit configured for selectively providing pressurized hydraulic fluid for actuating at least a selected one of the wheel brakes during a braking event. A pair of rear brake motors are provided for selectively electrically actuating respective left and right rear wheel parking brakes. A first electronic control unit is provided for at least partially controlling at least one of the power transmission unit and a selected one of the pair of rear brake motors. A second electronic control unit is provided for at least partially controlling at least one of the power transmission unit and an other one of the pair of rear brake motors. First and second SAP valves are located hydraulically between the power transmission unit and at least two selected wheel brakes. An isolation valve and a dump valve are associated with each wheel brake. The isolation valve is located hydraulically between a respective wheel brake and at least a corresponding one of the first and second SAP valves. The dump valve is located hydraulically between a respective wheel brake and the reservoir. The first electronic control unit controls at least one SAP valve, the isolation valve, and the dump valve for a selected two of the wheel brakes, and the second electronic control unit controls at least one SAP valve, the isolation valve, and the dump valve for an other two of the wheel brakes.

BRIEF DESCRIPTION OF THE DRAWINGS

For a better understanding, reference may be made to the accompanying drawings, in which.

DESCRIPTION OF ASPECTS OF THE DISCLOSURE

Unless defined otherwise, all technical and scientific terms used herein have the same meaning as is commonly understood by one of ordinary skill in the art to which the present disclosure pertains.

The invention comprises, consists of, or consists essentially of the following features, in any combination.

Figure 1:
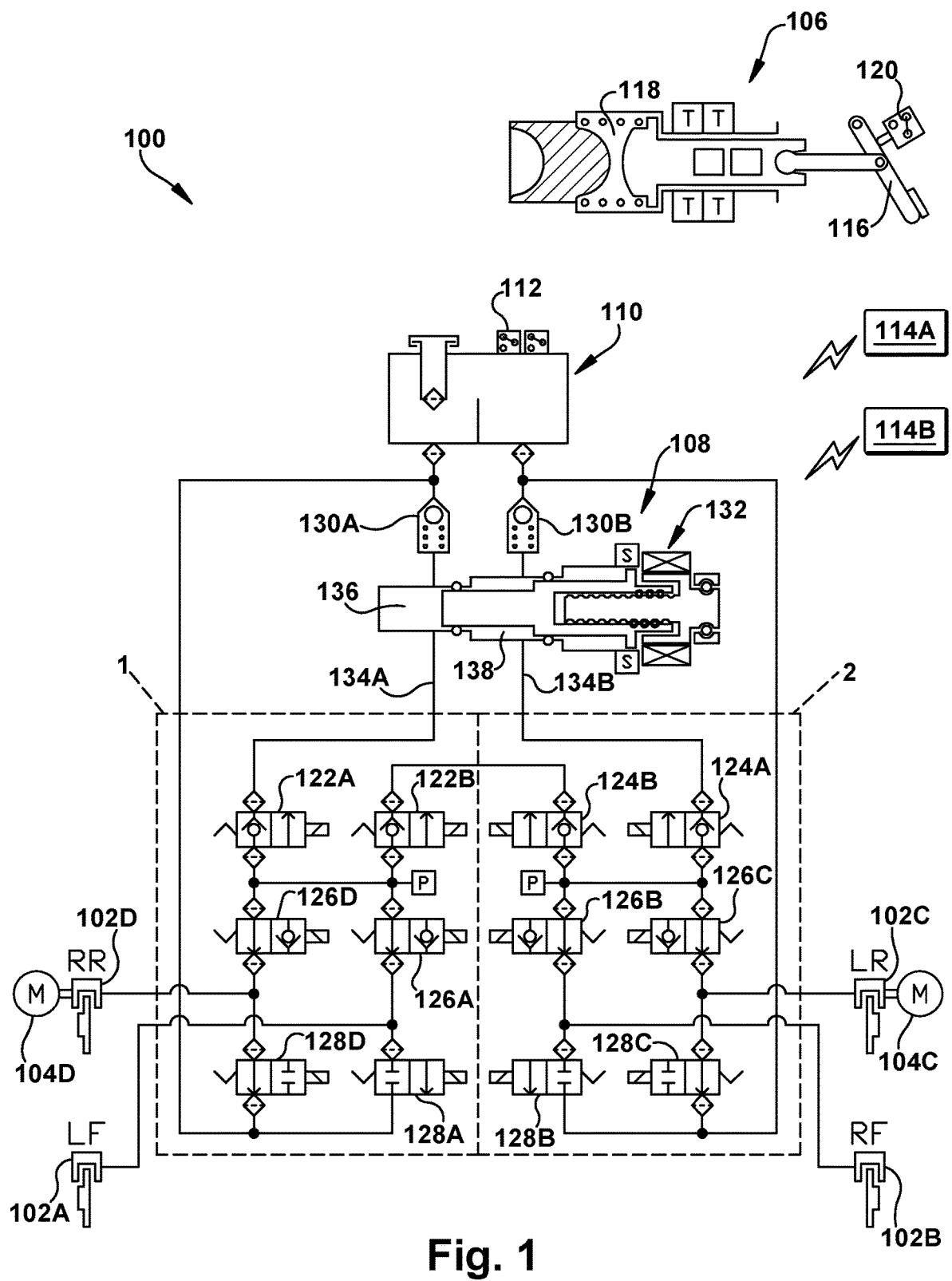
FIG. 1 is a schematic hydraulic diagram of a brake system according to the present invention, in a first configuration.

FIG. 1 depicts a brake system 100 for actuating a pair of front wheel brakes and a pair of rear wheel brakes, in a first configuration. The brake system 100 is shown here as a hydraulic brake by wire system in which electronically controlled fluid pressure is at least partially utilized to apply braking forces for the brake system 100. The brake system 100 may suitably be used on a ground vehicle, such as an automotive vehicle having four wheels with a wheel brake associated with each wheel. Furthermore, the brake system 100 can be provided with other braking functions such as anti-lock braking (ABS) and other slip control features to effectively brake the vehicle. Components of the brake system 100 may be housed in one or more blocks or housings. The block or housing may be made from solid material, such as aluminum, that has been drilled, machined, or otherwise formed to house the various components. Fluid conduits may also be formed in the block or housing.

In the illustrated embodiment of the brake system 100, there are four wheel brakes 102A, 102B, 102C, and 102D. The wheel brakes 102A, 102B, 102C, and 102D can have any suitable wheel brake structure operated electrically and/or by the application of pressurized brake fluid. Each of the wheel brakes 102A, 102B, 102C, and 102D may include, for example, a brake caliper mounted on the vehicle to engage a frictional element (such as a brake disc) that rotates with a vehicle wheel to effect braking of the associated vehicle wheel. The wheel brakes 102A, 102B, 102C, and 102D can be associated with any combination of front and rear wheels of the vehicle in which the brake system 100 is installed. For example, the brake system 100 may be configured as a diagonal split system, as shown, such that a first pressure circuit (indicated by dashed line "1" in FIG. 1) is associated with providing fluid to one or both of the left front and right rear wheel brakes 102A and 102D. A second pressure circuit (indicated by dashed line "2" in FIG. 1) may be associated with providing fluid to one or both of the right front and left rear wheel brakes 102B and 102C. As shown in FIG. 1, the front wheel brakes 102A and 102B are hydraulically operated, and the rear wheel brakes 102C and 102D are also hydraulically operated. However, the rear wheel brakes may also include the pair of rear wheel motors 104C and 103D for selectively electrically actuating respective left and right rear wheel parking brakes on the rear wheels, as shown in FIG. 1. It is contemplated that the brake motors 104C and 104D could also or instead provide a service brake function, at a predetermined time, to the respective wheels.

In this example, the wheel brake 102A may be associated with a left front wheel of the vehicle in which the brake system 100 is installed, and the wheel brake 102B may be associated with the right front wheel. The wheel brake 102C may be associated with the left rear wheel, and the wheel brake 102D may be associated with the right rear wheel. Alternatively, though not depicted here, the brake system 100 may be configured as a front/rear split brake system such that the wheel brakes 102A and 102D of the first pressure circuit are associated with wheels at the front or rear axle of the vehicle, and the wheel brakes 102B and 102C of the second pressure circuit are associated with wheels at the other axle of the vehicle.

The brake system 100 generally includes a brake pedal unit, indicated generally at 106, a power transmission unit (also known as a single acting plunger or a plunger assembly in some configurations), indicated generally at 108, and a fluid reservoir 110. The brake pedal unit 106 may be of the deceleration signal transmitter type. The reservoir 110 stores and holds hydraulic fluid for the brake system 100. The fluid within the reservoir 110 is preferably held at or about atmospheric pressure, but the fluid may be stored at other pressures if desired. The reservoir 110 is shown schematically having two tanks or sections with fluid conduit lines connected thereto. The sections can be separated by several interior walls within the reservoir 110 and are provided to prevent complete drainage of the reservoir 110 in case one of the sections is depleted due to a leakage via one of the two lines connected to the reservoir 110. Alternatively, the reservoir 110 may include multiple separate housings. The reservoir 110 may include at least one fluid level sensor 112 (two shown, for redundancy) for detecting the fluid level of one or more of the sections of the reservoir 110.

The power transmission unit 108 of the brake system 100 functions as a source of pressure to provide a desired pressure level to the hydraulically operated ones of the wheel brakes 102A, 102B, 102C, and 102D during a typical or normal non-failure brake apply. After a brake apply, fluid from the hydraulically operated ones of the wheel brakes 102A, 102B, 102C, and 102D may be returned to the power transmission unit 108 and/or diverted to the reservoir 110. In the depicted embodiment, the power transmission unit 108 is a single acting plunger assembly which is configured to provide hydraulic pressure to the brake system 100. It is also contemplated that a configurations (not shown) of the brake system 100 could include hydraulic control of fewer than four wheels, with the others optionally being electrically controlled/actuated. One of ordinary skill in the art would be readily able to provide such an arrangement for a desired use environment, following aspects of the present invention.

Regardless of specific configuration, though, the power transmission unit 108 is configured for selectively providing pressurized hydraulic fluid for actuating at least a selected one of the pair of front wheel brakes 102A, 102B and the pair of rear wheel brakes 102C, 102D during a typical or normal non-failure braking event.

The brake system 100 also includes at least one electronic control unit ("ECU") 114. While two ECUs 114A, 114B are shown schematically in the Figures and described herein, one of ordinary skill in the art could provide a single-ECU 114 as desired, according to the teachings herein. The ECUs 114 may include microprocessors and other electrical circuitry. The ECUs 114 receive various signals, process signals, and control the operation of various electrical components of the brake system 100 in response to the received signals. The ECUs 114 can be connected to various sensors such as the reservoir fluid level sensor 112, pressure sensors, travel sensors, switches, wheel speed sensors, and steering angle sensors. The ECUs 114 may also be connected to an external module (not shown) for receiving information related to yaw rate, lateral acceleration, longitudinal acceleration of the vehicle, or other characteristics of vehicle operation for any reason, such as, but not limited to, controlling the brake system 100 during vehicle braking, stability operation, or other modes of operation. Additionally, the ECUs 114 may be connected to the instrument cluster for collecting and supplying information related to warning indicators such as an ABS warning light, a brake fluid level warning light, and a traction control/vehicle stability control indicator light. The electronic control units 114A, 114B are each provided, in the configuration of the brake system 100 shown in FIG. 1, for controlling at least one of the power transmission unit 108 and at least a selected one of the wheel brakes 102, to facilitate redundant operation if one ECU 114A, 114B were to fail.

As shown schematically in the Figures, the brake pedal unit 106, when present, includes a brake pedal 116 connected thereto and actuated by the driver of the vehicle as the driver presses on the brake pedal 116 (moving the brake pedal 116 toward the left, in the orientation of the schematic brake pedal unit 106 shown in the Figures) to indicate a desired braking command. A hydraulic and/or mechanical pedal simulator 118, of any suitable type, may be provided to selectively resist pressure of the brake pedal 116 as desired and thereby provide an expected brake pedal 116 "feel" to the driver. A brake sensor or position switch 120 may be electrically connected to at least one ECU 114 to determine a position of the brake pedal 118 and responsively produce a braking signal indicating a depression of the brake pedal 120 and thus corresponding to the desired braking command. The braking signal is transmitted to at least one of the first and second ECUs 114A, 114B. At least one of the first and second ECUs 114A, 114B controls at least one of the power transmission unit 108 and at least one wheel brake 102 associated with the at least one first and second ECUs 114A, 114B responsive to the braking signal.

It is contemplated that the brake system 100 of all aspects and configurations shown and described herein may be controlled autonomously for at least a portion of the operating life of the corresponding vehicle. The brake pedal unit 106 could be omitted entirely, or could take a different form, as could readily be provided by one of ordinary skill in the art. Examples of alternately configured brake pedal units 106 for accepting a braking command from an operator include, but are not limited to, a mobile device app, a hand control, and/or another user-manipulable braking signal source. A braking signal could also or instead be provided completely autonomously, such as via one or more electronic control units 114, optionally under commands from a central vehicle operating computer or another braking command source. While the Figures shown and described herein depict a brake pedal unit 106 of the aforementioned configuration and two ECUs 114A, 114B, the present description should not be interpreted as limiting the source of the braking signal to any one or more of these components. The ECUs 114A, 114B may be connected in any suitable wired and/or wireless manner to any other component or combination thereof of the brake system 100, with a wireless connection being shown in the Figures, for simplicity. That is, as depicted in the Figures, the braking signal is wirelessly transmitted to at least one of the first and second electronic control units 114A, 114B.

The power transmission unit 108 shown in at least FIGS. 1-7 is configured for selectively providing pressurized hydraulic fluid for actuating at least a selected one of the pair of front wheel brakes 102A and 102B and the pair of rear wheel brakes 102C and 102D during a braking event. The electronic control units 114A, 114B control at least one of the power transmission unit 108 and the pair of rear brake motors 104C, 104D. To facilitate redundancy in the brake system 100 of the Figures, the power transmission unit 108 may be of a dual wound type, such that each of the ECUs 114 A, 114 B can selectively control actuation of the same power transmission unit 108, singly or in combination as will be described further below.

First and second single-acting plunger ("SAP") valves 122A and 122B, respectively, are located hydraulically between the power transmission unit 108 and at least two of the wheel brakes (i.e., the left front and right rear wheel brakes 102A, 102D associated with the first pressure circuit or the right front and left rear wheel brakes 102B, 102C associated with the second pressure circuit). Third and fourth SAP valves 124A and 124B, respectively, are located hydraulically between the power transmission unit 108 and at least two of the other wheel brakes that are not associated with the first and second SAP valves 122A, 122B. The first and third SAP valves 122A, 124A facilitate replenishment of the wheel brake hydraulic circuits when closed. The second and fourth SAP valves 122B, 124B help provide pressure balance across the brake circuits when open.

An isolation valve 126 and a dump valve 128 are associated with each wheel brake 102. One or more isolation valve(s) 126 may be provided to assist with both slip control and diagnostic functions for the brake system 100. One or more dump valve(s) 128 may be normally-open and facilitate venting of the associated wheel brake 102 to the reservoir 110 without requiring that the valves be energized during the venting. The dump valve(2) 128, when normally-open, may also or instead facilitate venting of the other wheel brake 102 on the same (first or second) pressure circuit via the normally-open isolation valve(s) 126. (The isolation valves 126 and dump valves 128 are labeled in the Figures with a suffixed "A", "B", "C", or "D" to indicate the corresponding one of the wheel brakes 102 with which each is associated). The isolation valves 144 are located hydraulically between their respective wheel brake 102 and at least a corresponding one of the first, second, third, and fourth SAP valves 122A, 122B, 124A, 124B. The dump valves 146 are located hydraulically between their respective wheel brake 102 and the reservoir 110.

At least FIG. 1 also depicts replenishing check valves 130A, 130B, which are located fluidically between the reservoir 110 and the power transmission unit 108. When present, the replenishing check valves 130A, 130B may be provided to assist with refilling of the power transmission unit 108 (or components thereof) under predetermined conditions. For example, the replenishing check valve 148 may help to facilitate a slip control feature, when pressure is repeatedly applied to, and dumped from, one or more brakes 102 and the power transmission unit 108 is at the end of its stroke. The power transmission unit 108 can then be retracted and refilled from the reservoir 110 via at least one replenishing check valve 130A, 130B.

In the brake system 100 shown in the Figures, the first ECU 114A is shown as being associated with the first pressure circuit and controls at least one SAP valve 122A, 122B, the isolation valves 126A, 126D, and the dump valves 128A, 128D for a selected two wheel brakes—here, left front wheel brake 102A and right rear wheel brake 102D. Likewise, the second ECU 114B is shown as being associated with the second pressure circuit and controls at least one SAP valve 124A, 124B, the isolation valves 126B, 126C, and the dump valves 128B, 128C for the other two wheel brakes—here, right front wheel brake 102B and left rear wheel brake 102C.

A selected one of the first and second ECUs 114A, 114B controls a selected one of the left and right rear brake motors 104C, 104D (associated with a respective left or right rear wheel parking brake) that is contralateral to the left or right rear wheel brake 102C, 102D which is also controlled by the selected ECU 114A or 114B. That is, in some example situations, the first ECU 114A may control the left rear brake motor 104C and the at least one SAP valve 122A, 122B, isolation valves 126A, 126C, and dump valves 128A, 128D for the right rear and left front wheel brakes 102D, 102A, and the second ECU 114B would then control the right rear brake motor 104D and the at least one SAP valve 124A, 124B, isolation valves 126B, 126C, and dump valves 128B, 128C for the left rear and right front wheel brakes 102B, 102C. In other example situations, the first ECU 114A may control the right rear brake motor 104D and the at least one SAP valve 124A, 124B, isolation valves 126B, 126C, and dump valves 128B, 128C for the left rear and right front wheel brakes 102B, 102C, and the second ECU 114B would accordingly control the left rear brake motor 104C and the at least one SAP valve 122A, 122B, isolation valves 126A, 126C, and dump valves 128A, 128D for the right rear and left front wheel brakes 102D, 102A.

Through the use of such contralateral control of the brake motors 104C, 104D as compared to the hydraulic wheel brakes controlled by each of the first and second ECUs 114A, 114D, braking may be retained on a minimum of three brakes (considering that the brake motor 104C or 104D can be used for service braking as well as a parking brake) even if one of the first and second ECUs 114A, 114D fails.

Similarly, the electronic control units 114A, 114B are described as selectively controlling the power transmission unit 108, and it should be noted that this control of the power transmission unit 108 is accomplished via control of an electric motor (shown schematically at 132) which drives one or more other components of the power transmission unit 108, as will be discussed further with reference to at least FIGS. 7 and 10. For at least the depicted use environments of the brake system 100, the electric motor 132 may be a dual-wound electric motor 132 having first and second windings, with the first ECU 114A selectively controlling the first winding and the second ECU 114B selectively controlling the second winding, to, again, provide redundancy to the system in the case of failure of one of the electronic control units 114A, 114B. Though the valve solenoids for any desired one(s) of the electrically actuated valves of the brake system 100 may similarly be dual-wound for redundant control by the first and second ECUs 114A, 114V as desired, such is not presumed in the present description but could be provided by one of ordinary skill in the art for a particular use application.

It should also be noted that the power transmission unit 108 of at least FIGS. 1-7 is of a stepped single acting plunger type, which is configured to generate hydraulic pressure at two different PTU outputs 134A, 134B, with each of the first and second PTU outputs 134A, 134B directing pressurized hydraulic fluid from a first or second chamber segment 136 or 138 of the power transmission unit 108 (as will be discussed below with reference to FIG. 7) to the valves and wheel brakes 102 of a respective first or second pressure circuit.

With reference now to FIGS. 2-6, five example operative configurations of the brake system 100 as shown, for example, in FIG. 1, are provided. Specifically, he heavy-line or solid-shaded portions of the structures of FIGS. 2-6 are under pressure. For example, as shown in the normal boosted braking mode depicted in FIG. 2, the first and second chamber segments 136 and 138 of the power transmission unit 108 are under pressure (indirectly) from the electric motor 132. This pressure is pushed through the first and second PTU outputs 134A, 134B into the corresponding first and second pressure circuits to energize all four of the wheel brakes 102. The wheel brakes 102A, 102B, 102C, and 102D are all under hydraulic pressure, as shown by the solid shading in FIG. 2.

Figure 2:
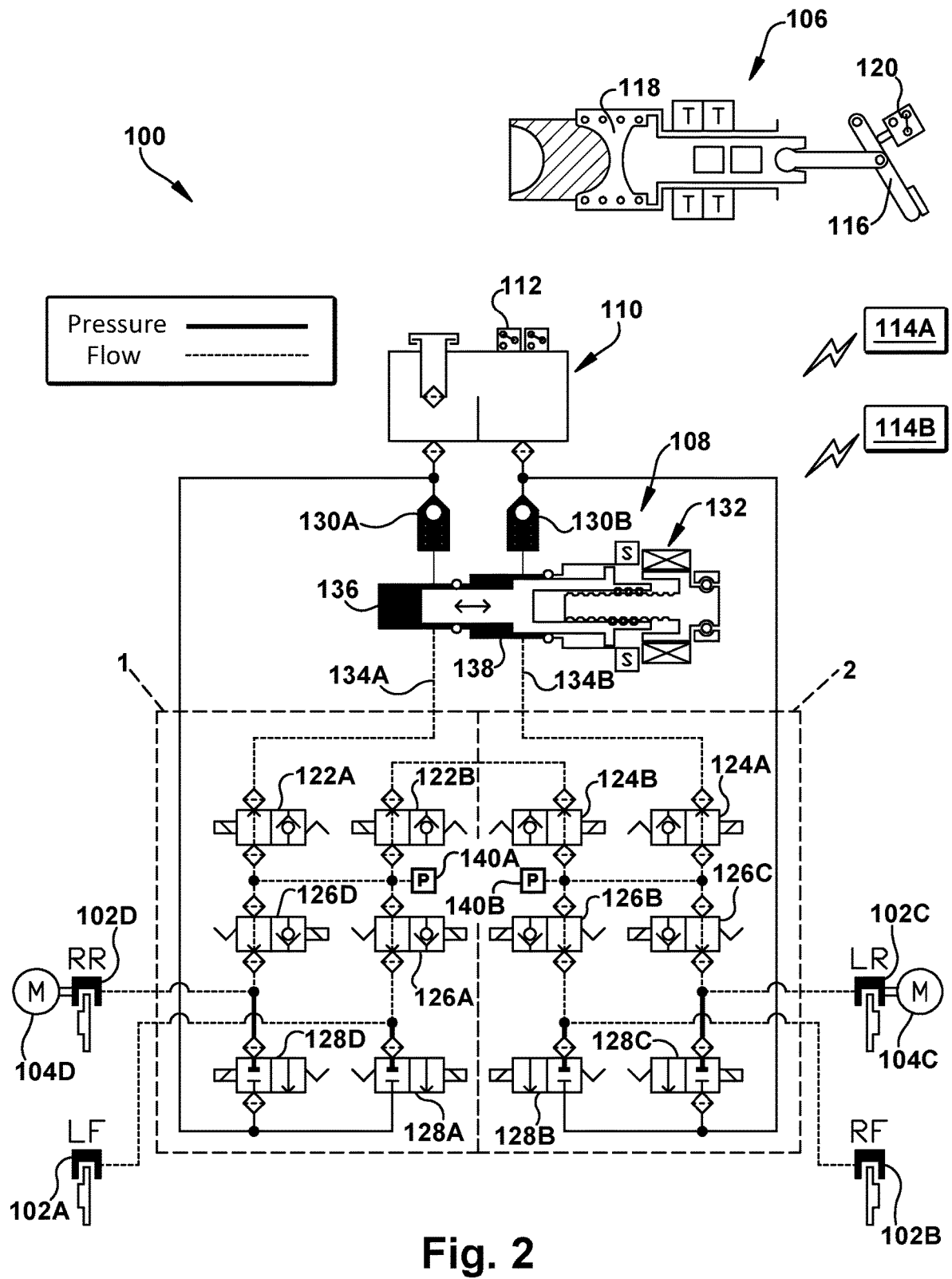
FIG. 2 is a schematic hydraulic diagram of the brake system of FIG. 1, in a first use condition.

The dashed lines in FIGS. 2-6 depict components which are subject to both pressure and fluid flow. For example, as shown in FIG. 2, hydraulic fluid is flowing from the power transmission unit 108 and through the SAP valves 122A, 122B, 124A, 124B and the isolation valves 126 to the respective wheel brakes 102 as noted by the dashed lines. However, the dump valves 128 are energized closed (by the respective first or second ECUs 114A, 114B) to prevent fluid flow back to the reservoir 112, as represented by the solid, non-heavy lines connecting the dump valves 128 to the reservoir 110 in FIG. 2. Pressure sensors 140A, 140B are provided to the first and second pressure circuits, respectively, to selectively provide information to each corresponding ECU 114A, 114B regarding the pressure of the hydraulic fluid flowing to the relevant brake circuits.

Figure 3:
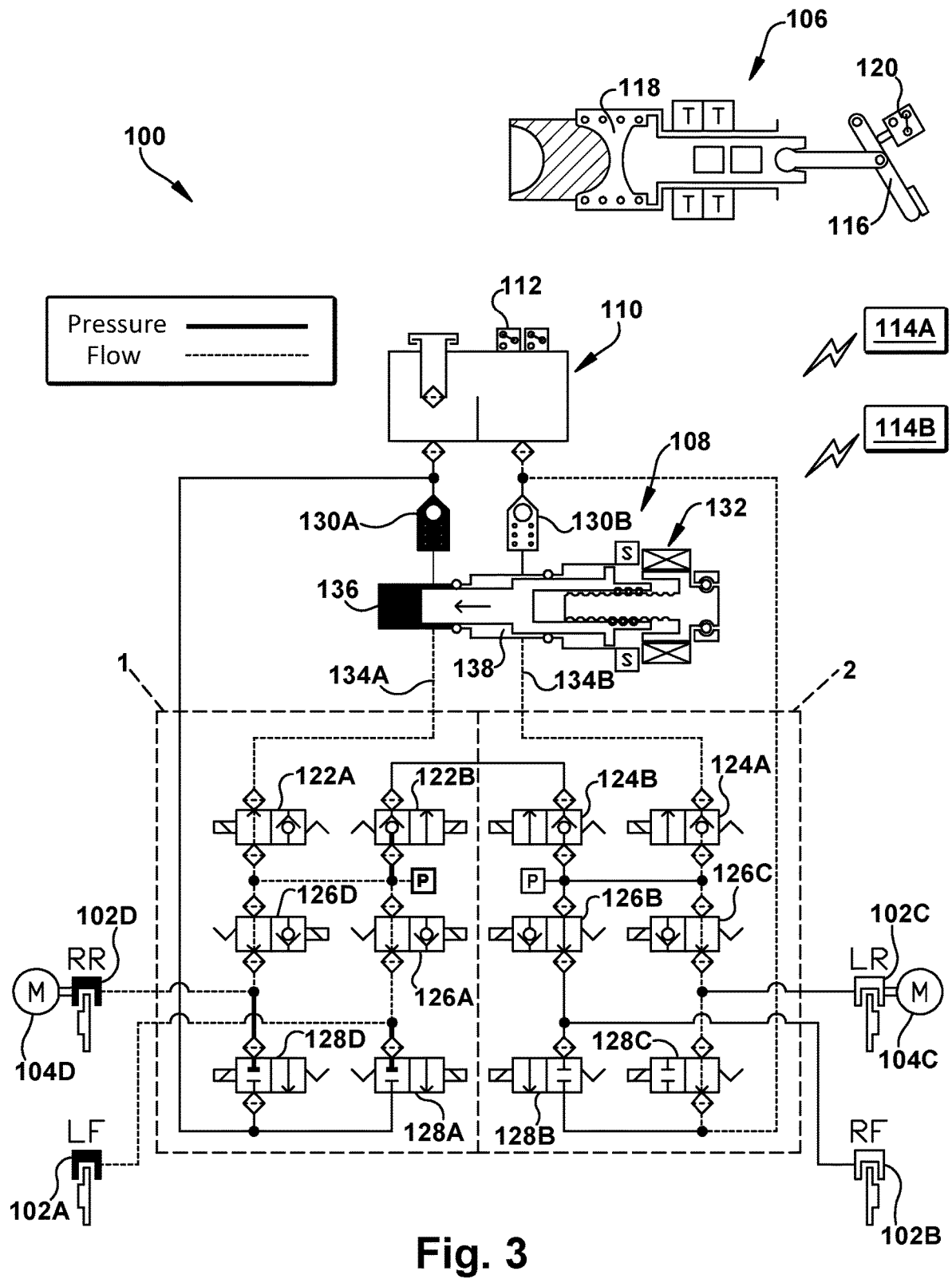
FIG. 3 is a schematic hydraulic diagram of the brake system of FIG. 1, in a second use condition.

Turning now to FIG. 3, an example situation is shown in which the second ECU 114B and/or the second pressure circuit is not operating, for some reason. Again as shown by the dark-shaded (heavy lines) components, hydraulic pressure is present in the first replenishing check valve 130A, the first chamber segment 136, and the left front and right rear wheel brakes 102A, 102D. Flow of hydraulic fluid (which naturally will be occurring under pressure), symbolized by the dashed lines, is being directed from the first chamber segment 136 to the left front and right rear wheel brakes 102A, 102D, through the various valves and hydraulic lines interposed politically therebetween. Also as depicted by the dashed lines in FIG. 3, hydraulic fluid is flowing in a "dump" manner from the right front and left rear wheel brakes 102B, 102C, via at least one of the de-energized dump valves 128B, 128C (here, through dump valve 128C). The situation shown in FIG. 3 can occur, for example, when any electrical, electronic, hydraulic, and/or mechanical component of the second ECU 114B and/or the second pressure circuit and associated brakes 102B, 102C are malfunctioning or are deactivated intentionally, for some reason. Because the brake motor 104C is associated with the contralateral, first pressure circuit, some parking and/or service brake function can be provided electrically to the left rear motor 102C, as desired, even taking into account the failure or deactivation of the hydraulic left rear wheel break 102C.

Figure 4:
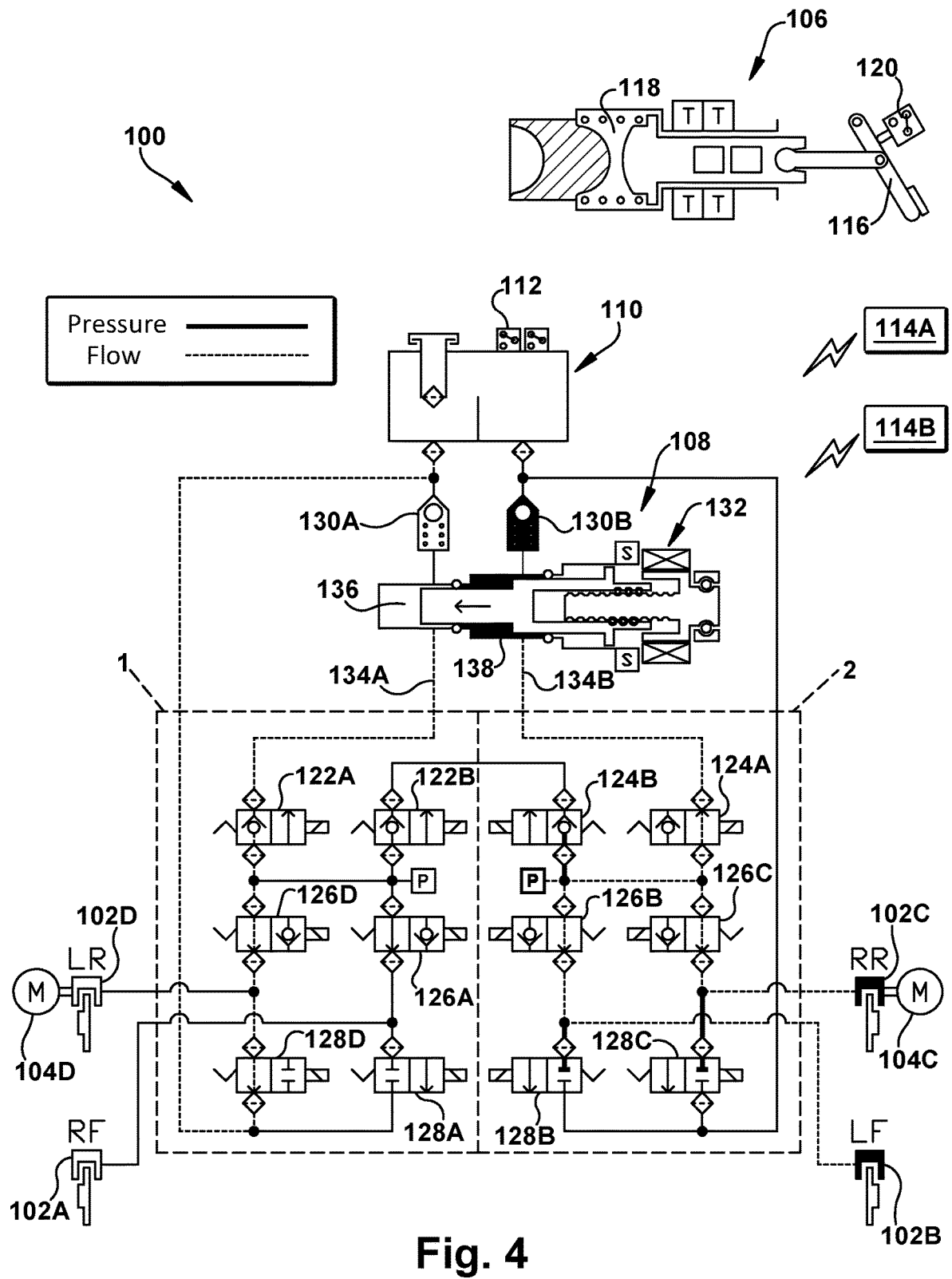
FIG. 4 is a schematic hydraulic diagram of the brake system of FIG. 1, in a third use condition.

FIG. 4 depicts a situation which is somewhat similar to that of FIG. 3, except that in FIG. 4, the first ECU 114B and/or the first pressure circuit and associated right front and left rear real brakes 102A, 102D are in a deactivated or failed status, and the second ECU 114B and the second pressure circuit (with associated left front and right rear wheel brakes 102B, 102C) are selectively actuated by hydraulic fluid flow from the second chamber segment 138, as indicated by the dark or heavy lines in FIG. 4. The hydraulic flow from the first chamber segment 136 towards the right front and left rear wheel brakes 102A, 102D is being dumped to reservoir 110, as shown by the dashed lines. Also analogously to the use configuration shown in FIG. 3, the left rear brake motor 104D is selectively actuated by the (contralateral) second ECU 114B, thus preserving some parking and/or service brake function in the left rear position despite the intentional or accidental loss of hydraulic actuation of the left rear wheel break 102 D.

Figure 5:
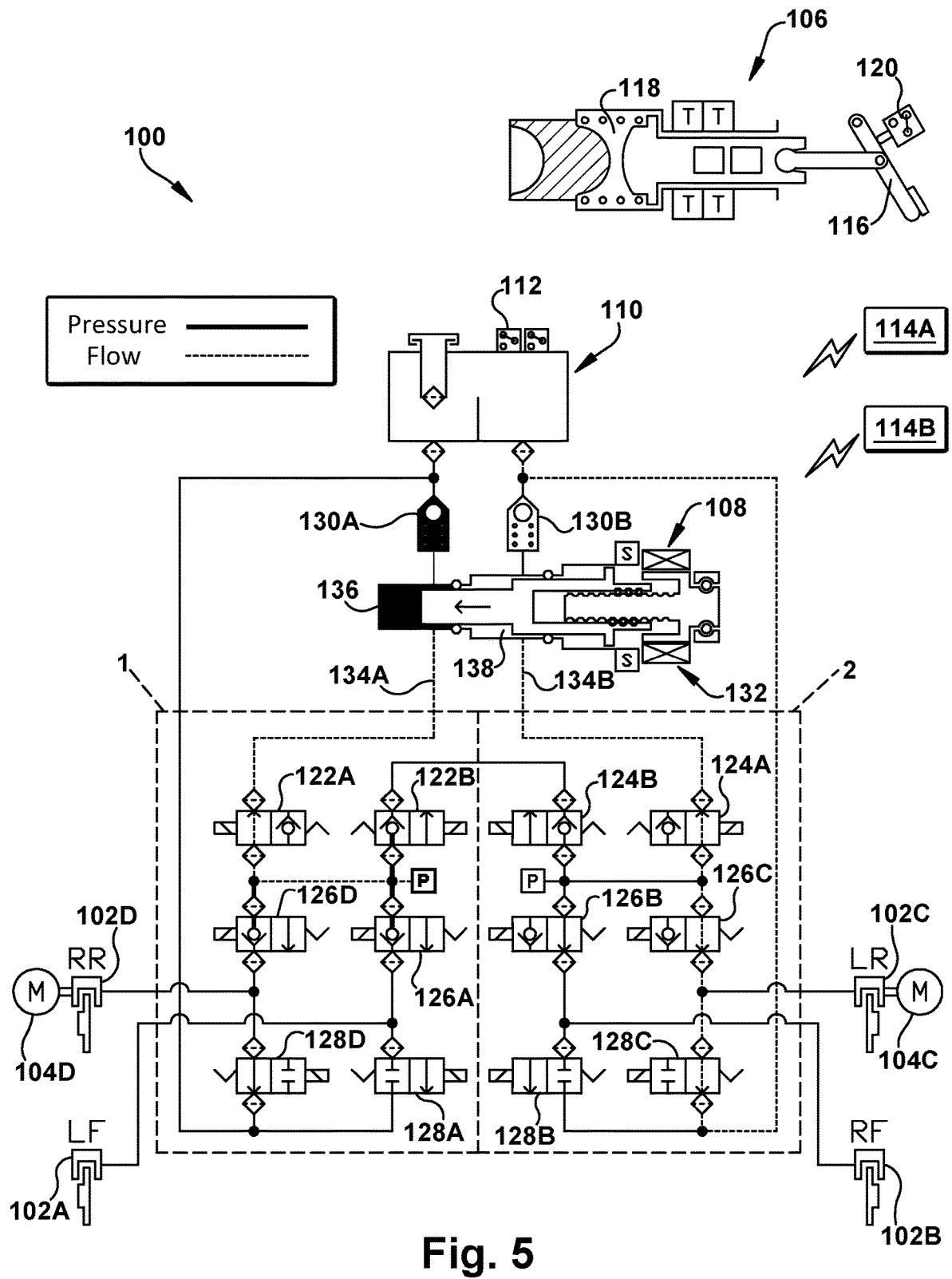
FIG. 5 is a schematic hydraulic diagram of the brake system of FIG. 1, in a fourth use condition.
Figure 6:
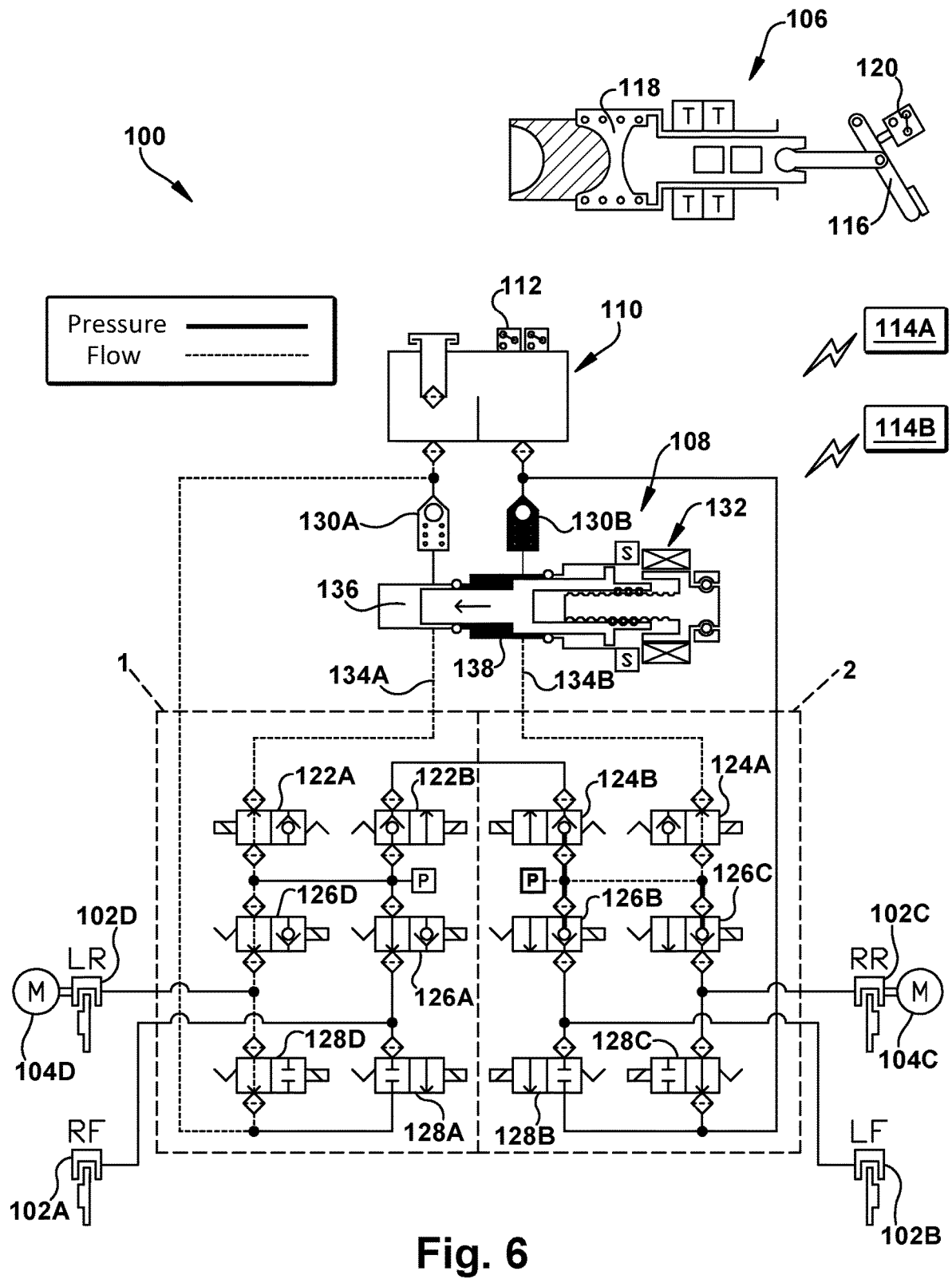
FIG. 6 is a schematic hydraulic diagram of the brake system of FIG. 1, in a fifth use condition.

FIGS. 5-6 depict situations analogous to each other, wherein diagnostics are being performed on one or the other of the first and second pressure circuits. It should be noted that none of the wheel brakes 102 is being actuated, hydraulically and/or electrically, during the diagnostic situations of FIGS. 5-6.

In FIG. 5, the second pressure circuit is being tested. The first replenishing check valve 130A and the first chamber segment 136 are pressurized, sending fluid flow (as signified by the dashed lines) to the energized second SAP valve 122B and to the energized isolation valves 126A, 126D associated with the first pressure circuit. The fourth SAP valve 124B is also energized, in the second pressure circuit, which allows fluid from the second chamber segment 138 to be dumped, by at least the normally-open, de-energized dump valve 128C, to the reservoir 110.

In FIG. 6, then, the first pressure circuit is being tested. The second replenishing check valve 130B and the second chamber segment 138 are pressurized, sending fluid flow (as signified by the dashed lines) to the energized fourth SAP valve 124B and to the energized isolation valves 126B, 126C associated with the second pressure circuit. Second SAP valve 122B is also energized, in the first pressure circuit, which allows fluid from the first chamber segment 136 to be dumped, by at least the normally-open, de-energized dump valve 128D, to the reservoir 110.

Figure 7:
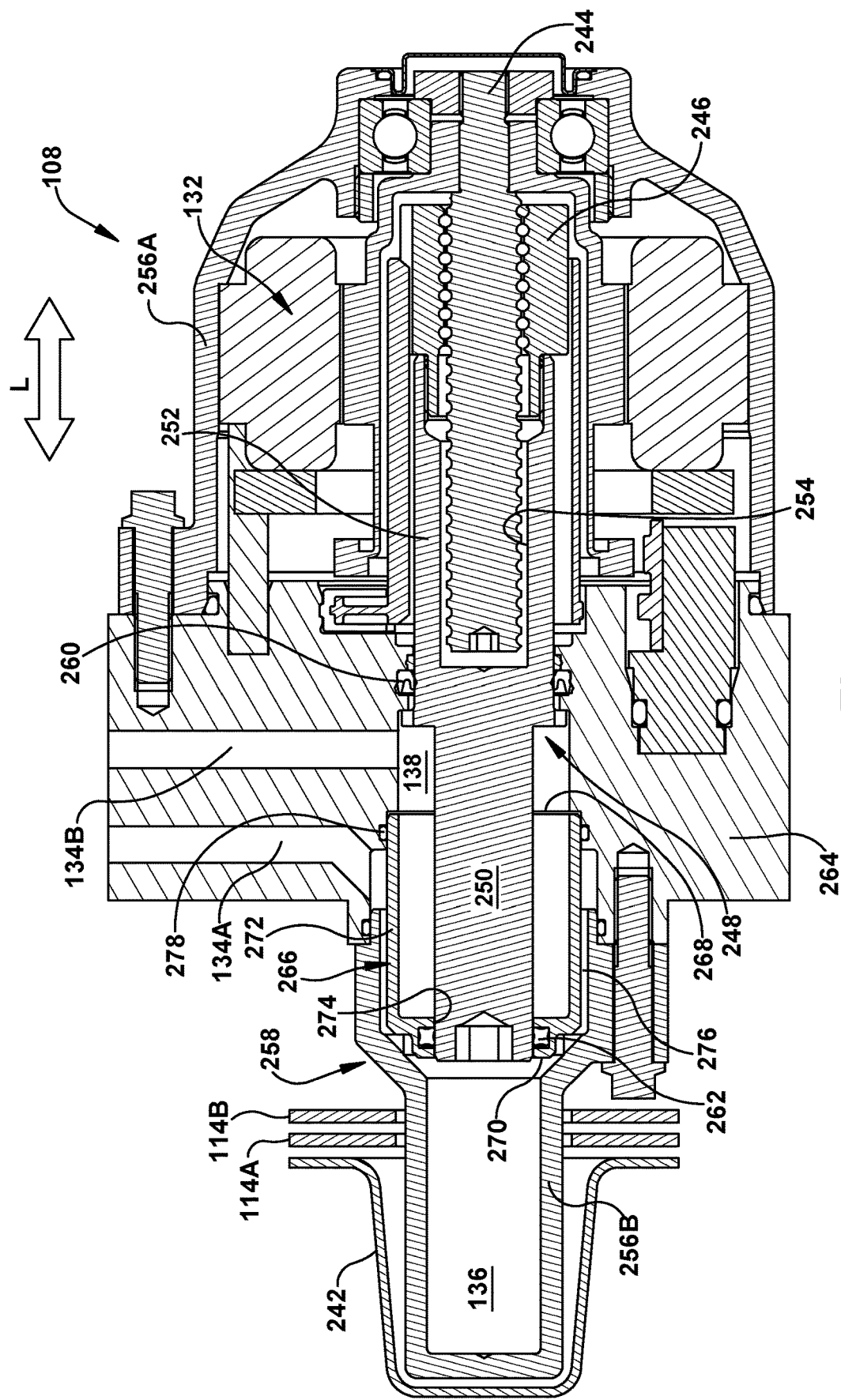
FIG. 7 is a schematic partial cross-sectional view of a component suitable for use in the brake system of FIG. 1.

FIG. 7 schematically depicts an example power transmission unit 108 which can be used to provide the two outputs 134A, 134B previously mentioned. The power transmission unit 108 of FIG. 7 is of a type termed a "stepped plunger PTU". As shown here schematically by way of example, the first and second ECUs 114A, 114B may be co-located with, optionally surrounding at least a part of, the power transmission unit 108. In the depicted configuration, an ECU cover 242 is provided to help shield at least one of the ECUs 114A, 114B, from ambient hazards. It is contemplated that the ECU cover 242, or other components of the brake system 100, could be configured to create separate ECU cavities for each of multiple ECUs 114 of the brake system, as desired. One of ordinary skill in the art will be able to provide one or more suitable ECUs 114 for a particular use environment of the brake system 100.

The stepped single acting plunger type power transmission unit 108, shown in FIG. 7, includes a ball screw 244, a ball nut 246 selectively driven by the ball screw 244, and a plunger piston 248 operatively coupled to the ball nut 246, such that the ball screw 244 indirectly drives the plunger piston 248. The plunger piston 248 includes longitudinally adjacent first and second piston segments 250 and 252, respectively. The "longitudinal" direction, as shown in the orientation of FIG. 7, is substantially aligned with longitudinal arrow L in that Figure. The first piston segment 250 has a first cross-sectional footprint, and the second piston segment 252 has a second cross-sectional footprint which is larger than the first cross-sectional footprint. For example, when a cross-section of the first piston segment 250 is substantially circular, the second piston segment 252 may have a substantially circular (or any other shape) cross-section with a larger area than the area of the cross-section of the first piston segment 250. It is contemplated that a cross-sectional footprint shape of each of the first and second piston segments 250, 252 will be coordinated with an interior lumen shape of the respective first or second chamber segment 136, 138, to fit closely therein in a piston/tube type manner.

As with any component of the brake system 100, the first and second piston segments 250, 252 may be integrally or monolithically formed as a single-piece plunger piston 248, or may be provided as separate subassemblies, as desired for a particular use environment. In the power transmission unit 108 configuration shown in FIG. 7, the second piston segment 252 includes a ball screw cavity 254, which allows the ball screw 244 to selectively extend into the body of the second piston segment 252, thereby potentially reducing the total dimension of the power transmission unit 108 in the longitudinal direction.

A housing 256 at least partially encloses the plunger piston 248, the ball screw 244, and the ball nut 246. A plunger chamber 258, comprising the first and second chamber segments 136, 138, is at least partially defined by the housing 256 and at least one of the first and second cross-sectional footprints of the plunger piston 248. It is contemplated that one or more seals, such as, but not limited to, the large and small plunger seals 260, 262 may be provided to help fluidically separate the first and second chamber segments 136, 138 from each other in the plunger chamber 258. The plunger chamber 258 is configured to contain hydraulic fluid and is selectively pressurized by reciprocal motion of the plunger piston 248 with respect to the housing 256. The plunger chamber 258 includes, as mentioned, the first and second chamber segments 136, 138, which are configured to receive the first and second piston segments 250, 252, respectively, for reciprocal motion within the plunger chamber 258. The first chamber segment 136 has a first bore cross-sectional area, and the second chamber segment 138 has a second bore cross-sectional area which is larger than the first bore cross-sectional area. Again, as mentioned above, the first and second bore cross-sectional areas, and the cross-sectional shapes thereof, are selectively coordinated with the cross-sectional shapes of the first and second piston segments 250, 252 to facilitate pressurization of hydraulic fluid within the first and second chamber segments 136, 138 in a desired manner.

The first output channel (shown here as first PTU output 134A) is in fluid communication between the first chamber segment 136 and at least one SAP valve 122, 124 associated with at least one selected wheel brake 102. The second output channel (shown here as second PTU output 134 B) is in fluid communication between the second chamber segment 138 and at least one SAP valve 122, 124 associated with at least one other wheel brake 102 than the one which is in fluid communication with the first output channel 134A. The first and second output channels 134A, 134B may be fluidically separated from one another by structures of the power transmission unit, such as a block 264 into which the housing 256 is connected. It is also contemplated, as shown in FIG. 7, that the housing 256 could be provided in multiple parts, such as 256A and 256B, with each segment of that housing 256 enclosing different components and/or chambers of the power transmission unit 108.

An electric motor 132, which may be the aforementioned dual wound electric motor, may be provided for selectively driving the ball screw 244 of the single acting plunger assembly type power transmission unit 108 to responsively reciprocate the plunger piston within the plunger housing. Through control of the electric motor 132, the ECUs 114A, 114B may control actuation of the power transmission unit 108, which results in control of supply of pressurized hydraulic fluid to other portions of the brake system 100.

With reference again to FIG. 7, the power transmission unit 108 may include a cuplike floating seal retainer 266 located within the second chamber segment 138 and having proximal and distal retainer faces 268 and 270, respectively, separated by an annular retainer body 272. The distal retainer face 270 includes a piston aperture 274 configured to receive the first piston segment 250 slidingly therethrough. As shown in FIG. 7, the small plunger seal 262 could be positioned in or adjacent to the piston aperture 274, to help seal against the first piston segment 250. The piston aperture 274 has an aperture footprint which is smaller than the second cross-sectional footprint of the second piston segment 252, such that the second piston segment 252 is prevented from passing through at least a portion of the piston aperture 274. The seal retainer 266 could have a substantially right cylindrical shape, or could include any other desired configuration. Optionally, the seal retainer 266 could have a longitudinally fluted outer surface around the retainer body 272 to facilitate fluid flow between the first chamber segment 136 and a portion of the first PTU output 134A formed in the block 264. The seal retainer 266 can "float" perpendicular to (i.e., can move laterally with respect to, and/or rotationally about) and/or parallel to the longitudinal direction. The floating seal retainer 266 and first piston segment 250 cooperatively resist fluid communication between the first and second chamber segments 136, 138 through the piston aperture 274. There is a narrow annular space located laterally between the seal retainer 266 and an inner wall of the plunger chamber 258, which helps to separate (optionally with the assistance of retainer seal 278) the channel of the first PTU output 134A from the channel of the second PTU output 134B. Stated differently, the floating seal retainer 266 and an inner surface of the second chamber segment 138 cooperatively define an annular second chamber space 276 placing the first output channel 134A, or at least a portion thereof formed in the block 264, in fluid communication with the first chamber segment 136. An inner surface of the floating seal retainer 266 is in fluid communication with the second output channel 134B.

As a result, under influence of the electric motor with 132 driving the ball screw 244, the ball nut 246 reciprocates longitudinally within at least a portion of the housing 256. Such movement of the ball nut 246 causes the plunger piston 248 to likewise reciprocate with respect to the plunger chamber 258. Motion of the first piston segment 250 toward the left, in the orientation of FIG. 7, causes hydraulic fluid within the first chamber segment 136 to become pressurized, travel through the annular space 276, and flow, under pressure, out of the power transmission unit 108 through the first PTU output 134A. Similarly, and also due to motion of the plunger piston 248, motion of the second piston segment 252 toward the left, in the orientation of FIG. 7, causes hydraulic fluid within the second chamber segment 138 to become pressurized (at least partially against an inner surface of the seal retainer 266) and flow, under pressure, out of the power transmission unit 108 through the second PTU output 134B. Through use of such a stepped plunger chamber 258, two physically separate sources of pressurized hydraulic fluid can be used to separately provide output pressure at two PTU output channels 134A, 134B. When the electric motor 132 is of a dual wound type, relatively high pressure can still be built on any desired number of the four wheel brakes 102, even if one of the ECUs 114A, 114B is not functioning correctly to control the electric motor 132. When one of the ECUs 114A, 114B fails completely and no longer controls a respective first or second pressure circuit, hydraulic pressure can still be provided by the power transmission unit 108 shown in FIG. 72 actuate the wheel brakes 102 on the remaining first or second pressure circuit, despite the status of the ECU 114 on the field pressure circuit.

Figure 8:
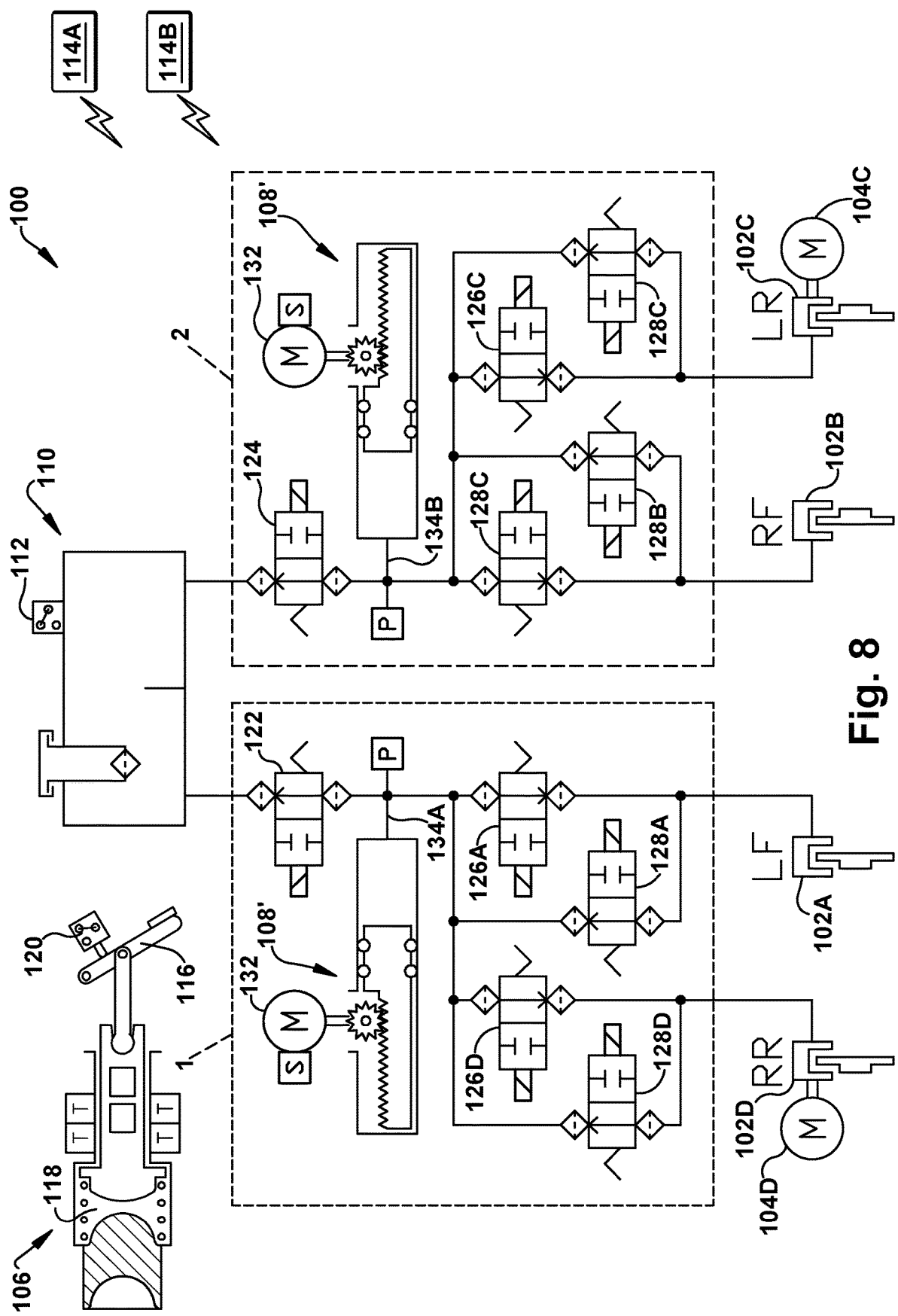
FIG. 8 is a schematic hydraulic diagram of a brake system according to the present invention, in a second configuration.

With reference now to FIG. 8, a second configuration of the brake system 100 is depicted, parts or all of which can be used with other components of the present invention, as desired. Description of similar components and operation which is made elsewhere in this application will not necessarily be repeated for each and every described configuration or aspect of the brake system 100, for brevity, but should instead be considered to apply to like-numbered portions of other configurations as appropriate.

Figure 9:
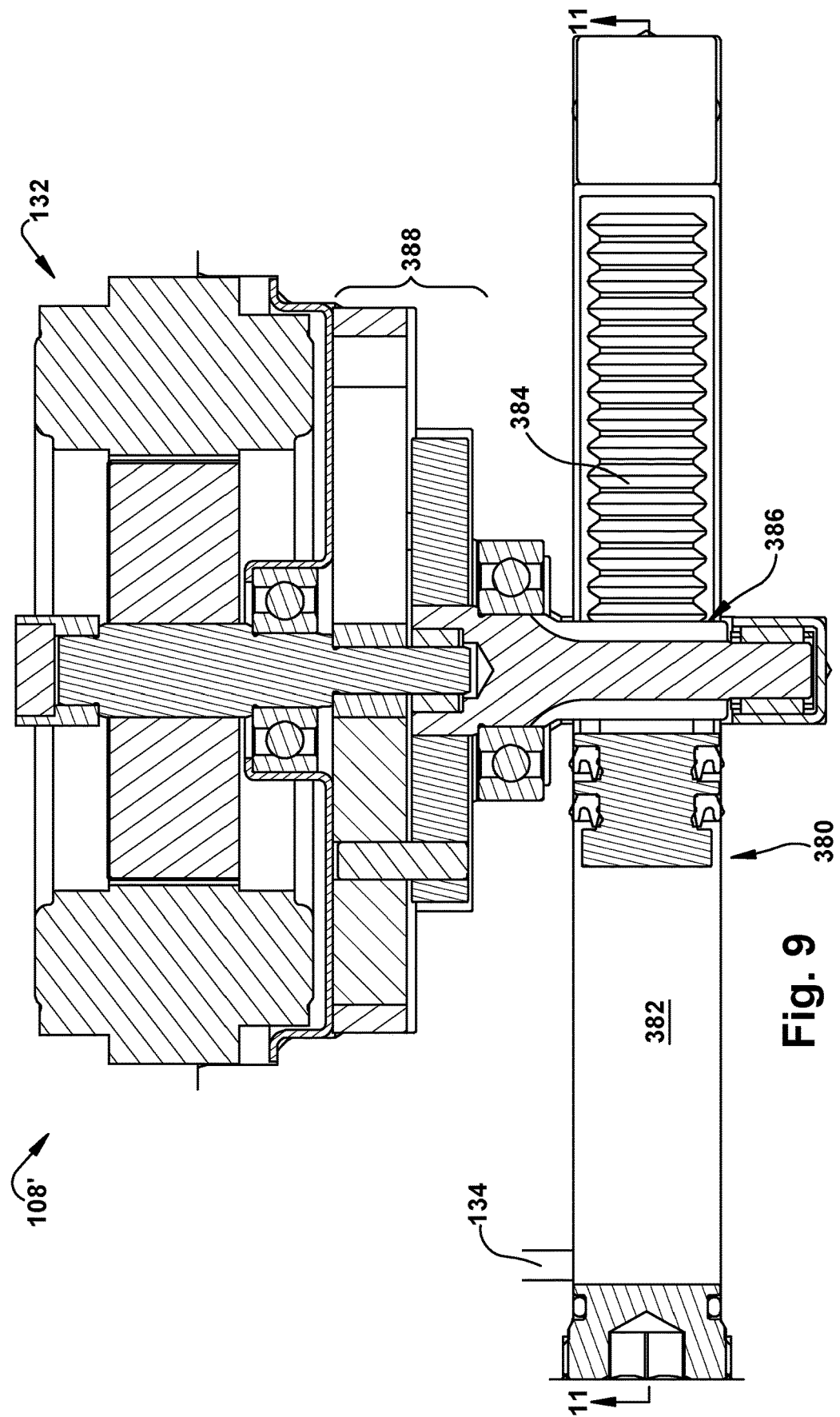
FIG. 9 is a schematic partial cross-sectional view of a component suitable for use in a brake system of the present invention, in a first configuration.
Figure 11:
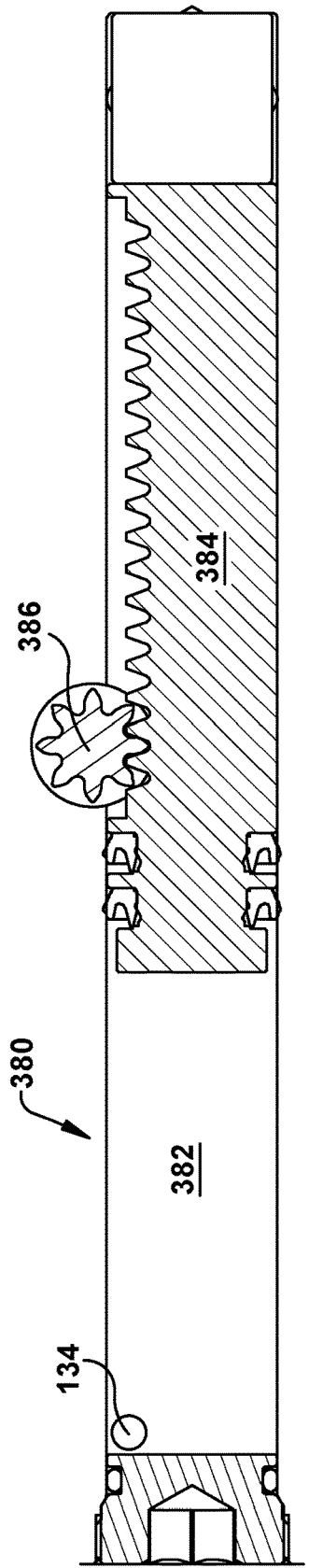
FIG. 11 is a cross-sectional view taken along line 11-11 in FIG. 9.

The brake system 100 of FIG. 8 includes first and second pressure circuits, denoted by the dashed lines "1" and "2" in FIG. 8. Here, though, each of the first and second pressure circuits includes its own dedicated power transmission unit 108'. Unlike the stepped plunger type power transmission unit 108 of FIGS. 1-7, the power transmission unit 108' shown in FIGS. 8-9 and 11 is of a rack-and-pinion type. The power transmission unit 108' could be substituted for, or with, a single, non-stepped plunger type power transmission unit in any of the brake systems 100 shown in the Figures and described herein. Through the use of first and second ECUs 114A, 114B, the first and second pressure circuits may be used to provide hydraulic braking pressure to pairs of wheel brakes 102, similarly to the brake system 100 shown in FIGS. 1-6. Also akin to the earlier described brake system 100, brake motors 104 can be controlled in a contralateral manner with a goal of providing at least partial brake ability for at least three of the wheels of the vehicle, even if one of the ECUs 114A, 114B intentionally or inadvertently is not functioning as desired. Here, valves 122 and 124 are shown as providing a venting function to the respective circuit.

Figure 12:
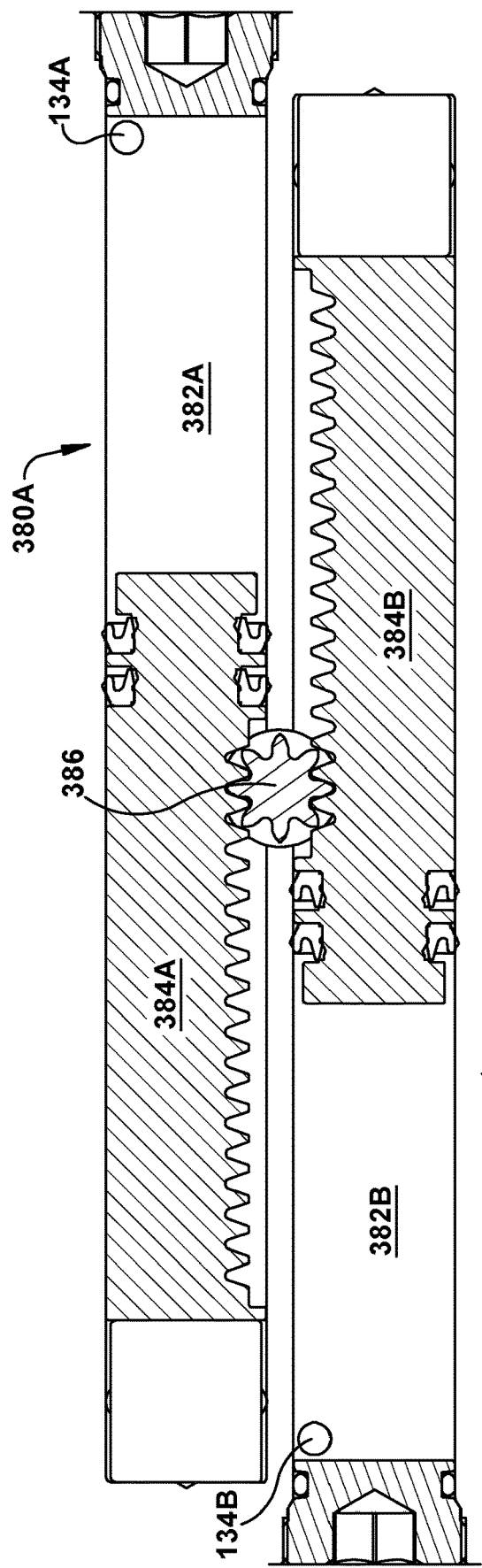
FIG. 12 is a cross-sectional view taken along line 12-12 in FIG. 10.

The power transmission unit 108' of FIG. 8 is shown in more detail in FIGS. 9 and 11-12. With reference to FIGS. 9 and 11, the power transmission unit 108' includes a plunger housing 380 defining a plunger chamber 382 within which a racked piston 384 is configured to reciprocate relative thereto. The plunger chamber 382 is configured to contain hydraulic fluid and is selectively pressurized by reciprocal motion of the racked piston 384. A housing pinion gear 386 is toothedly connected to the racked piston 384 for driving reciprocal motion of the racked piston 384. An output channel 134 (a.k.a., PTU output 134) is in fluid communication between the plunger chamber 382 and at least a selected wheel brake 102. As mentioned, an electric motor 132 is provided for selectively driving the pinion gear 386 to responsively reciprocate the racked piston 384 within the plunger housing 380.

Figure 13:
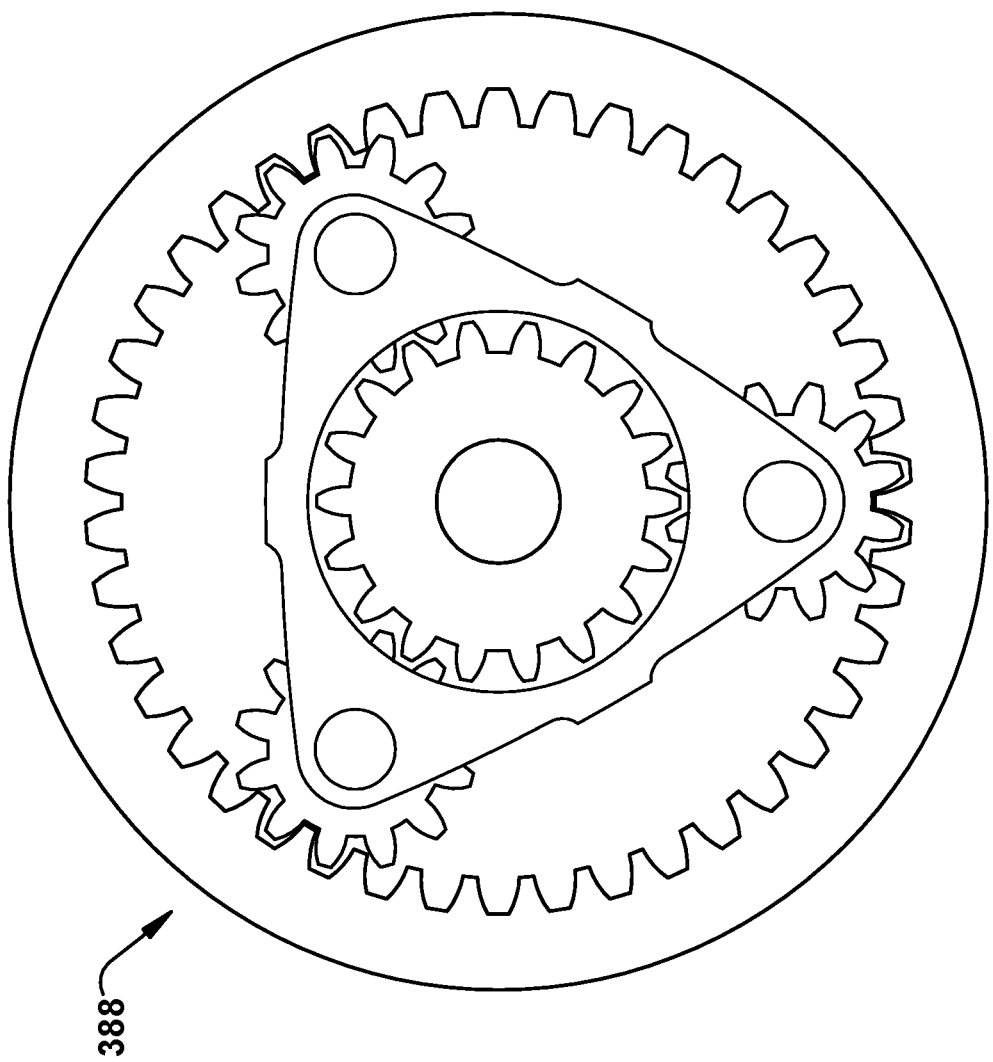
FIG. 13 is a schematic plan view of a subcomponent of the component of FIG. 9.

A planetary gearset 388, such as that shown in plan view in FIG. 13, may be mechanically interposed between the electric motor 132 and the pinion gear 386, as shown in FIG. 9, to provide a mechanical advantage as desired for a particular electric motor 132 output and desired pinion gear 386 torque. As with the previously described electric motors, the electric motor 132 depicted in FIG. 9 may be a dual-wound electric motor having first and second windings, with the first electronic control unit 114A selectively controlling the first winding, and the second electronic control unit 114B selectively controlling the second winding, to provide redundancy in control for the electric motor 132, as desired.

In the brake system 100 of FIG. 8, there are two power transmission units 108', with a first power transmission unit 108' operatively provided to the first pressure circuit, and a second power transmission unit 108', substantially similar to the first power transmission unit 108', operatively provided to the second pressure circuit. As shown in FIG. 8, the first and second power transmission units 108' are spaced apart, hydraulically if not also mechanically (i.e., by being located remote from one another within the brake system 100).

Figure 10:
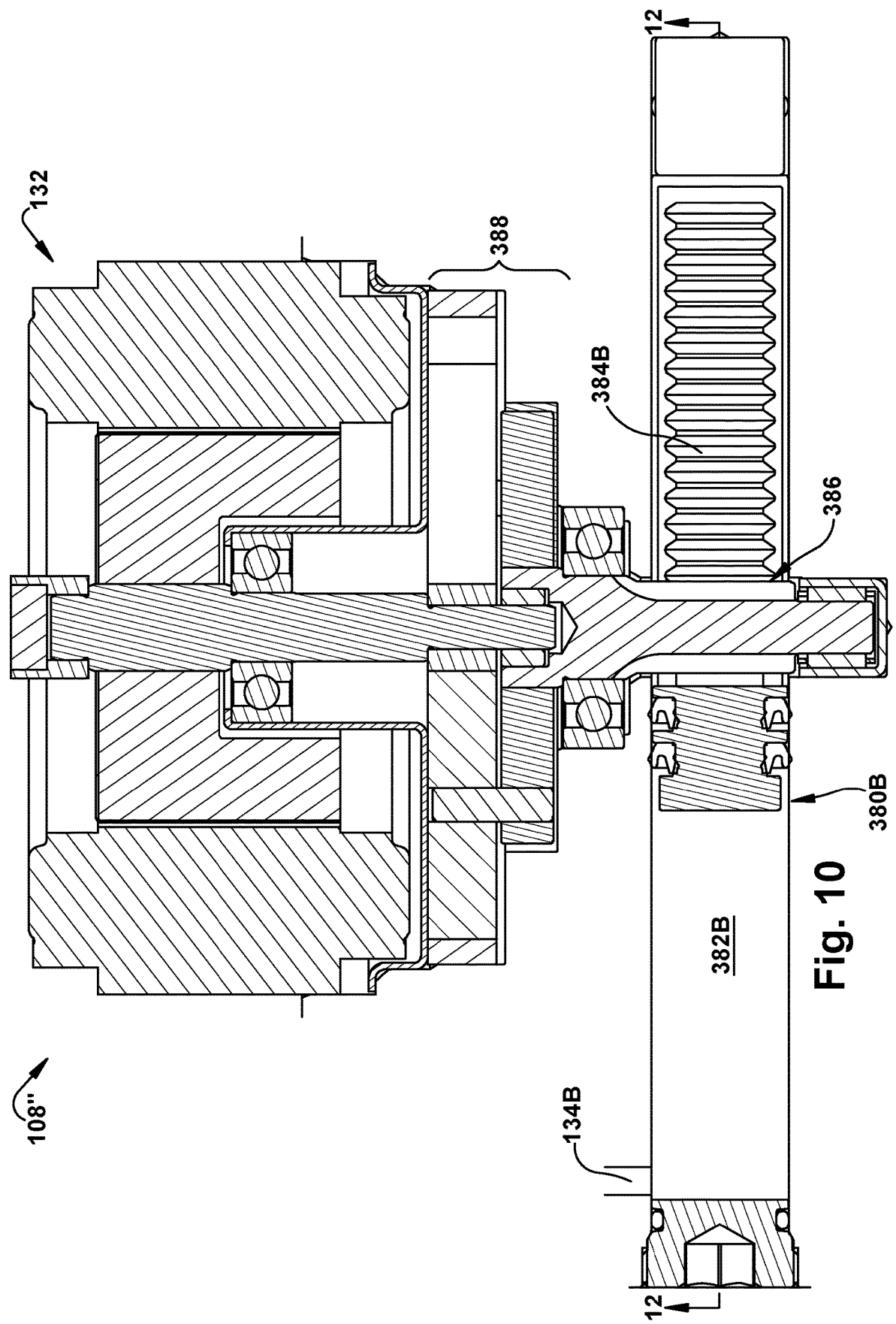
FIG. 10 is a schematic partial cross-sectional view of the component of FIG. 9, in a second configuration.

As another option which can be used as a power transmission unit with any of the brake systems described herein and shown in any of the Figures, FIGS. 10 and 12 depict a power transmission unit 108", wherein the plunger housing 380 is a first plunger housing 380A, and the power transmission unit 108" includes a second plunger housing 380B defining a second plunger chamber 382B within which a second racked piston 384B is configured to reciprocate relative thereto. The second plunger chamber 382B is configured to contain hydraulic fluid and is selectively pressurized by reciprocal motion of the second racked piston 384B. The pinion gear is toothedly connected to the second racked piston 384B for driving reciprocal motion of the second racked piston 384B. A second output channel 134B is in fluid communication between the second plunger chamber 382B and at least one wheel brake 102 other than the wheel brake(s) 102 which is/are in fluid communication with the first output channel 132A. The electric motor 132 is configured to selectively drive the (single) pinion gear 386 to responsively reciprocate the first plunger piston 384A within the first plunger housing 380A and concurrently responsively reciprocate the second plunger piston 384B within the second plunger housing 380 B.

As with the single rack and pinion power transmission unit 108' shown in FIGS. 9 and 11, a planetary gearset 388, such as that shown in plan view in FIG. 13, may be mechanically interposed between the electric motor 132 and the pinion gear 386, as shown in FIG. 10, to provide a mechanical advantage as desired for a particular electric motor 132 output and desired pinion gear 386 torque in the power transmission unit 108" of FIGS. 10 and 12. Also as with the previously described electric motors, the electric motor 132 depicted in FIG. 10 may be a dual-wound electric motor having first and second windings, with the first electronic control unit 114A selectively controlling the first winding, and the second electronic control unit 114B selectively controlling the second winding, to provide redundancy in control for the electric motor 132, as desired. The Figures of the present application are not drawn to scale. However, the electric motor 132 depicted in FIG. 10 may be larger and/or more powerful than the electric motor 132 depicted in FIG. 9, because the former drives first and second racked pistons 384A, 384B, while the latter only drives one racked piston 384.

It is contemplated that the double rack-and-pinion type power transmission unit 108" of FIGS. 10 and 12 could be used, as previously mentioned in place of the stepped single acting plunger type power transmission unit 108 of FIGS. 1-7, and vice versa. It is also contemplated that the double rack-and-pinion type power transmission unit 108″ of FIGS. 10 and 12 could be used in place of one or both of the single rack-and-pinion type power transmission units 108′ of FIGS. 9 and 11, and that one of ordinary skill in the art would be able to configure a brake system 100 to use any desired power transmission unit design or combination thereof.

As depicted with respect to the double rack-and-pinion power transmission unit 108″ shown in FIGS. 10 and 12, the first and second plunger housings 380A, 380B may be located in "parallel" relationship, with the pinion gear 386 being interposed between oppositely facing first and second racked pistons 384A, 384B. That is, the first and second plunger housings 380A, 380B may be both spaced substantially the same distance apart from the electric motor 132 to "sandwich" the pinion gear 386 therebetween, especially as shown in FIG. 12. In the arrangement depicted in FIG. 12, rotation of the pinion gear 386 concurrently drives motion of the first and second racked pistons 384A, 384B in opposite longitudinal directions.

In contrast, though not shown, a differently configured arrangement of the power transmission unit 108″ could be provided, with the first and second plunger housings 380A, 380B located in "serial" relationship. As would readily be understood by one of ordinary skill in the art, the pinion gear 386 in such a serial-drive power transmission unit 108″ would be an elongated pinion gear 386, with the first plunger housing 380A being interposed between the second plunger housing 380 B and the electric motor 132 along the elongated pinion gear 386. In such an arrangement, rotation of the pinion gear 386 would concurrently drive motion of the first and second racked pistons 384A, 384B in a common longitudinal direction. Stated differently, instead of sandwiching the pinion gear 386 between the first and second racked pistons 384A, 384B as shown in at least FIG. 12, the pinion gear 386 would lay in the same relation to two side-by-side racked pistons 384A, 384B.

It is contemplated that the parking brakes for the rear wheel brakes 102C and 102D—described herein as being electrically powered—could also or instead be powered hydraulically, rather than electrically. Such an arrangement of the rear wheel parking brakes could be facilitated by one of ordinary skill in the art through the provision of suitable hydraulic valves and lines, according to the teachings of the present invention.

It is contemplated that components, arrangements, or any other aspects of the brake system 100 shown and described herein could also or instead be used in the brake systems shown and depicted in co-pending patent applications U.S. patent application Ser. No. 17/366,682 filed concurrently herewith and titled "APPARATUS AND METHOD FOR CONTROL OF A HYDRAULIC BRAKE BY WIRE SYSTEM", and/or U.S. patent application Ser. No. 17/366,623, filed concurrently herewith and titled "APPARATUS AND METHOD FOR REDUNDANT CONTROL OF A HYDRAULIC BRAKE SYSTEM", both of which are hereby incorporated by reference in their entirety for all purposes.

As used herein, the singular forms "a", "an", and "the" can include the plural forms as well, unless the context clearly indicates otherwise. It will be further understood that the terms "comprises" and/or "comprising", as used herein, can specify the presence of stated features, steps, operations, elements, and/or components, but do not preclude the presence or addition of one or more other features, steps, operations, elements, components, and/or groups thereof.

As used herein, the term "and/or" can include any and all combinations of one or more of the associated listed items.

It will be understood that when an element is referred to as being "on", "attached" to, "connected" to, "coupled" with, "contacting", "adjacent", etc., another element, it can be directly on, attached to, connected to, coupled with, contacting, or adjacent the other element, or intervening elements may also be present. In contrast, when an element is referred to as being, for example, "directly on", "directly attached" to, "directly connected" to, "directly coupled" with, "directly contacting", or "directly adjacent" another element, there are no intervening elements present. It will also be appreciated by those of ordinary skill in the art that references to a structure or feature that is disposed "directly adjacent" another feature may have portions that overlap or underlie the adjacent feature, whereas a structure or feature that is disposed "adjacent" another feature might not have portions that overlap or underlie the adjacent feature.

Spatially relative terms, such as "under", "below", "lower", "over", "upper", "proximal", "distal", and the like, may be used herein for ease of description to describe one element or feature's relationship to another element(s) or feature(s) as illustrated in the figures. It will be understood that the spatially relative terms can encompass different orientations of a device in use or operation, in addition to the orientation depicted in the figures. For example, if a device in the figures is inverted, elements described as "under" or "beneath" other elements or features would then be oriented "over" the other elements or features.

As used herein, the phrase "at least one of X and Y" can be interpreted to include X, Y, or a combination of X and Y. For example, if an element is described as having at least one of X and Y, the element may, at a particular time, include X, Y, or a combination of X and Y, the selection of which could vary from time to time. In contrast, the phrase "at least one of X" can be interpreted to include one or more Xs.

It will be understood that, although the terms "first", "second", etc. may be used herein to describe various elements, these elements should not be limited by these terms. These terms are only used to distinguish one element from another. Thus, a "first" element discussed below could also be termed a "second" element without departing from the teachings of the present disclosure. The sequence of operations (or steps) is not limited to the order presented in the claims or figures unless specifically indicated otherwise.

While aspects of this disclosure have been particularly shown and described with reference to the example aspects above, it will be understood by those of ordinary skill in the art that various additional aspects may be contemplated. For example, the specific methods described above for using the apparatus are merely illustrative; one of ordinary skill in the art could readily determine any number of tools, sequences of steps, or other means/options for placing the above-described apparatus, or components thereof, into positions substantively similar to those shown and described herein. In an effort to maintain clarity in the Figures, certain ones of duplicative components shown have not been specifically numbered, but one of ordinary skill in the art will realize, based upon the components that were numbered, the element numbers which should be associated with the unnumbered components; no differentiation between similar components is intended or implied solely by the presence or absence of an element number in the Figures. Any of the described structures and components could be integrally formed as a single unitary or monolithic piece or made up of separate sub-components, with either of these formations involving any suitable stock or bespoke components and/or any suitable material or combinations of materials. Any of the described structures and components could be disposable or reusable as desired for a particular use environment. Any component could be provided with a user-perceptible marking to indicate a material, configuration, at least one dimension, or the like pertaining to that component, the user-perceptible marking potentially aiding a user in selecting one component from an array of similar components for a particular use environment. A "predetermined" status may be determined at any time before the structures being manipulated actually reach that status, the "predetermination" being made as late as immediately before the structure achieves the predetermined status. The term "substantially" is used herein to indicate a quality that is largely, but not necessarily wholly, that which is specified—a "substantial" quality admits of the potential for some relatively minor inclusion of a non-quality item. Though certain components described herein are shown as having specific geometric shapes, all structures of this disclosure may have any suitable shapes, sizes, configurations, relative relationships, cross-sectional areas, or any other physical characteristics as desirable for a particular application. Any structures or features described with reference to one aspect or configuration could be provided, singly or in combination with other structures or features, to any other aspect or configuration, as it would be impractical to describe each of the aspects and configurations discussed herein as having all of the options discussed with respect to all of the other aspects and configurations. A device or method incorporating any of these features should be understood to fall under the scope of this disclosure as determined based upon the claims below and any equivalents thereof.

Other aspects, objects, and advantages can be obtained from a study of the drawings, the disclosure, and the appended claims.

What is claimed is:

1. A brake system for selectively actuating at least one of a right rear wheel brake, a left front wheel brake, a left rear wheel brake, and a right front wheel brake, the system comprising:
   a reservoir;
   a power transmission unit configured for selectively providing pressurized hydraulic fluid for actuating at least a selected one of the wheel brakes during a braking event;
   first and second rear brake motors for selectively electrically actuating respective left and right rear wheel parking brakes;
   a first electronic control unit for at least partially controlling at least one of the power transmission unit and the first rear brake motor;
   a second electronic control unit for at least partially controlling at least one of the power transmission unit and the second rear brake motor;
   first and second SAP valves located hydraulically between the power transmission unit and at least two selected wheel brakes; and
   an isolation valve and a dump valve associated with each wheel brake, the isolation valve being located hydraulically between a respective wheel brake and at least a corresponding one of the first and second SAP valves, and the dump valve being located hydraulically between a respective wheel brake and the reservoir, the SAP valves, the isolation valves, and the dump valves collectively defining first and second pressure circuits associated with respective first and second pairs of the wheel brakes and controllable by the respective first and second electronic control units;
   wherein the power transmission unit is a stepped single acting plunger type power transmission unit, including
   a ball screw,
   a ball nut selectively driven by the ball screw,
   a plunger piston operatively coupled to the ball nut, the plunger piston including longitudinally adjacent first and second piston segments, the first piston segment having a first cross-sectional footprint, and the second piston segment having a second cross-sectional footprint which is larger than the first cross-sectional footprint,
   a housing at least partially enclosing the plunger piston, the ball screw, and the ball nut, and
   a plunger chamber at least partially defined by the housing and at least one of the first and second cross-sectional footprints of the plunger piston, the plunger chamber being configured to contain hydraulic fluid and selectively pressurized by reciprocal motion of the plunger piston with respect to the housing, the plunger chamber including first and second chamber segments configured to receive the first and second piston segments, respectively, for reciprocal motion within the plunger chamber, wherein the first chamber segment has a first bore cross-sectional area, and the second chamber segment has a second bore cross-sectional area which is larger than the first bore cross-sectional area,
   a first output channel in fluid communication between the first chamber segment and at least one SAP valve associated with a selected wheel brake,
   a second output channel in fluid communication between the second chamber segment and at least one SAP valve associated with an other wheel brake, the first and second output channels being fluidically separated from one another by structures of the power transmission unit, and
   an electric motor for selectively driving the ball screw of the single acting plunger assembly type power transmission unit to responsively reciprocate the plunger piston within the plunger housing.

2. The brake system of claim 1, wherein the first electronic control unit controls the left rear brake motor and the at least one SAP valve, isolation valve, and dump valve for the right rear and left front wheel brakes, and the second electronic control unit controls the right rear brake motor and the at least one SAP valve, isolation valve, and dump valve for the left rear and right front wheel brakes.

3. The brake system of claim 1, wherein the first electronic control unit controls the right rear wheel brake motor and the at least one SAP valve, isolation valve, and dump valve for the left rear and right front wheel brakes, and the second electronic control unit controls the left rear brake motor and the at least one SAP valve, isolation valve, and dump valve for the right rear and left front wheel brakes.

4. The brake system of claim 1, wherein a selected one of the first and second electronic control units controls a selected one of the left and right rear brake motors that is contralateral to the left or right rear wheel brake which is also controlled by the selected electronic control unit.

5. The brake system of claim 1, including at least one replenishing check valve located fluidically between the reservoir and the power transmission unit for assisting with refilling of the power transmission unit under predetermined conditions.

6. The brake system of claim 1, including a brake pedal connected to a brake pedal unit and selectively actuated by a driver of the vehicle to indicate a desired braking command, the brake pedal unit having a brake sensor for determining a position of the brake pedal and responsively producing a braking signal corresponding to the desired braking command, the braking signal being transmitted to at least one of the first and second electronic control units, and the at least one of the first and second electronic control units controlling at least one of the power transmission unit and at least one wheel brake associated with the at least one first and second electronic control units responsive to the braking signal.

7. The brake system of claim 6, wherein the braking signal is wirelessly transmitted to the at least one of the first and second electronic control units.

8. The brake system of claim 1, including a cuplike floating seal retainer located within the second chamber segment and having proximal and distal retainer faces separated by an annular retainer body, the distal retainer face including a piston aperture configured to receive the first piston segment slidingly therethrough, the piston aperture having an aperture footprint which is smaller than the second cross-sectional footprint, the floating seal retainer and first piston segment cooperatively resisting fluid communication between the first and second chamber segments through the piston aperture.

9. The brake system of claim 8, wherein the floating seal retainer and an inner surface of the second chamber segment cooperatively define an annular second chamber space placing the first output channel in fluid communication with the first chamber segment, an inner surface of the floating seal retainer being in fluid communication with the second output channel.

10. The brake system of claim 1, wherein the electric motor is a dual-wound electric motor having first and second windings, the first electronic control unit selectively controlling the first winding and the second electronic control unit selectively controlling the second winding.

11. The brake system of claim 1, wherein the electric motor is a dual-wound electric motor having first and second windings, the first electronic control unit selectively controlling the first winding and the second electronic control unit selectively controlling the second winding.

12. The brake system of claim 1, wherein in the event of a malfunction of the first electronic control unit the second electronic control unit is configured to control braking on three wheels and in the event of a malfunction of the second electronic control unit the first electronic control unit is configured to control braking on three wheels.

13. The brake system of claim 1, wherein in the event of a malfunction of the first electronic control unit the second electronic control unit hydraulically controls the second pair of wheel brakes and electrically controls the second rear brake motor.

14. The brake system of claim 1, wherein in the event of a malfunction of the second electronic control unit the first electronic control unit hydraulically controls the first pair of wheel brakes and electrically controls the first rear brake motor.

15. The brake system of claim 1, wherein the first brake motor is contralateral to the first pressure circuit and the second brake motor is contralateral to the second pressure circuit such that both the first and the second electronic control units are operated during a non-failure brake apply of all four wheel brakes.

* * * * *